United States Patent [19]

Hoeschele

[11] 3,723,569

[45] Mar. 27, 1973

[54] BLENDS OF COPOLYESTERS WITH CURED EPOXY RESINS

[75] Inventor: Guenther Kurt Hoeschele, Wilmington, Del.

[73] Assignee: E. I. du Pont de Nemours and Company, Wilmington, Del.

[22] Filed: Mar. 20, 1972

[21] Appl. No.: 236,445

[52] U.S. Cl. ............... 260/835, 260/40 R, 260/47 R, 260/75 R, 260/45.9 R, 260/830 R, 260/860
[51] Int. Cl. ............................................ C08g 45/14
[58] Field of Search .......................... 260/835, 830 R

[56] References Cited

UNITED STATES PATENTS

| | | | |
|---|---|---|---|
| 2,890,196 | 6/1959 | Phillips | 260/835 |
| 2,890,197 | 6/1959 | Phillips | 260/835 |
| 2,935,488 | 5/1960 | Phillips | 260/835 |
| 3,297,782 | 1/1967 | Barkis | 260/835 |
| 3,378,497 | 4/1968 | Lanham | 260/830 R |
| 3,397,254 | 8/1968 | Wynstra | 260/835 |
| 3,670,045 | 6/1972 | Koleske | 260/830 R |

FOREIGN PATENTS OR APPLICATIONS

| 872,254 | 7/1961 | Great Britain | 260/835 |
|---|---|---|---|

Primary Examiner—Paul Lieberman
Attorney—Michael Conner

[57] ABSTRACT

An improved usually thermosetting copolyester composition comprising:

a. at least one segmented copolyester polymer consisting essentially of (1) about 5–85 weight percent of recurring long chain ester units derived from at least one dicarboxylic acid having a molecular weight below about 300 and at least one poly- (alkylene oxide) glycol having a molecular weight between about 400–6,000 and a carbon-to-oxygen ratio of about 2.0–4.3 and (2) about 15–95 weight percent of short chain ester units which are derived from at least one low molecular weight diol having a molecular weight of less than about 250 and at least one low molecular weight dicarboxylic acid having a molecular weight of less than about 300, b. about 1.0 to 50 percent by weight based on said copolyester, of a polyepoxide having a functionality of at least two and c. about 0.5 to 1.1 equivalents, per epoxy equivalent, of an epoxy curing agent selected from aromatic and aliphatic polyamines and cyclic anhydrides of polycarboxylic acids.

Optionally from 0.05 to 0.5 weight percent based on said copolyester of an epoxy catalyst may be included in the composition.

16 Claims, No Drawings

BLENDS OF COPOLYESTERS WITH CURED EPOXY RESINS

BACKGROUND OF THE INVENTION

Linear copolyesters or copolyetheresters have been utilized heretofor for various purposes, particularly for the production of films and fibers but the known polymers of this type have not been as effective as would be desired for certain applications. In particular, certain copolyesters of this type which possess very desirable properties such as superior tear strength, tensile strength, flex life, abrasion resistance and low temperature properties may, for particular designated uses, have to be improved with regard to characteristics such as hydrolytic stability, scuff resistance and high temperature properties. Thus for uses such as hydraulic hose tubes, steam hose, hose covers and wire covering a combination of outstanding hydrolytic stability, scuff resistance and high temperature properties are often needed. In particular, scuff resistance in combination with outstanding low temperature properties is needed for molded snowmobile tracks and ski boots and other molded or extruded goods exposed to rough handling at low temperature.

SUMMARY OF THE INVENTION

According to this invention there is provided an improved usually thermosetting copolyester polymer which possesses superior scuff resistance, hydrolytic stability and high temperature properties.

The copolyester which is to be improved by the instant invention consists essentially of a multiplicity of recurring intralinear long chain and short chain ester units connected head-to-tail through ester linkages, said long chain ester units being represented by the following structure:

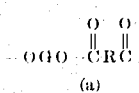
(a)

and said short chain ester units being represented by the following structure:

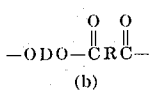
(b)

wherein:

G is a divalent radical remaining after removal of terminal hydroxyl groups from poly(alkylene oxide) glycols having a carbon-to-oxygen ratio of about 2.0–4.3 and molecular weight between about 400 and 6,000;

R is a divalent radical remaining after removal of carboxyl groups from a dicarboxylic acid having a molecular weight less than about 300; and D is a divalent radical remaining after removal of hydroxyl groups from a low molecular weight diol having a molecular weight less than about 250.

With the provisos that the short chain ester units constitute about 15–95 percent by weight of the copolyester and, ergo, the long chain ester units constitute about 5 to 85 percent by weight of the copolyester; at least about 50 percent of the short chain ester units must be identical and a homopolymer in the fiber-forming molecular weight range (molecular weight > 5,000) consisting of the identical short chain ester units must melt at at least 150°C.

The copolyester is modified by adding to it, after it is formed 1. a polyepoxide having a functionality of at least about 2 which has an epoxide equivalent of about 50–2,000 and which may be depicted by the general formula:

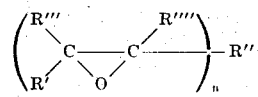

where $n$ has a value of about 2 to 15, $R'$, $R'''$ and $R''''$ are independently hydrogen or lower alkyl, e.g., $C_1$ to $C_4$, and $R''$ is a polyvalent radical containing only the elements of C, H and O with the exception that carbocyclic aromatic nuclei contained in $R''$ may be substituted with Cl or Br, $R'$ and $R''$ may also be joined to form a five or six membered carbocyclic ring and 2. an epoxy curing agent selected from
   a. aromatic and aliphatic polyamines having at least two amine groups represented by the formulas

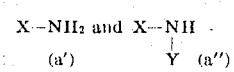

where X is an aromatic or aliphatic (including cycloaliphatic) radical and Y is an aliphatic radical and X and Y may be joined to form a five or six membered ring and X and/or Y contain at least one more amine group which can be represented by formulas (a') and/or (a'') and (b) cyclic anhydrides of polycarboxylic acids containing at least one structural unit represented by the following general formula

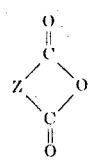

where Z is a bivalent radical which forms a five or six membered ring in combination with the two carbonyl carbon atoms and the oxygen atom of the anhydride.

In an embodiment of the instant invention an epoxy catalyst may also be added to the copolyester.

DETAILED DESCRIPTION

The term "long chain ester units" as applied to units in a polymer chain refers to the reaction product of a long chain glycol with a dicarboxylic acid. Such long chain ester units, which are a repeating unit in the copolyesters of this invention, correspond to formula (a) above. The long chain glycols are polymeric glycols having terminal (or as nearly terminal as possible) hydroxy groups and a molecular weight from about 400–6,000. The long chain glycols used to prepare the copolyesters of this invention are poly(alkylene oxide) glycols having a carbon-to-oxygen ratio of about 2.0–4.3. Representative long chain glycols are poly(ethylene oxide) glycol, poly(1,2- and 1,3-propylene oxide) glycol, poly(tetramethylene oxide) glycol, random or block copolymers of ethylene oxide and 1,2-propylene oxide, and random or block copolymers of tetrahydrofuran with minor amounts of a second monomer such as 3-methyltetrahydrofuran (used in proportions such that the carbon-to-oxygen mole ratio in the glycol does not exceed about 4.3).

The term "short chain ester units" as applied to units in a polymer chain refers to low molecular weight compounds or polymer chain units having molecular weights less that about 550. They are made by reacting a low molecular weight diol (below about 250) with a dicarboxylic acid to form ester units represented by formula (b) above.

Included among the low molecular weight diols which react to form short chain ester units are acyclic, alicyclic, and aromatic dihydroxy compounds. Preferred are diols with 2–15 carbon atoms such as ethylene, propylene, tetramethylene, pentamethylene, 2,2-dimethyltrimethylene, hexamethylene, and decamethylene glycols, dihydroxy cyclohexane, cyclohexane dimethanol, resorcinol, hydroquinone, 1,5-dihydroxy naphthalene, etc. Especially preferred are aliphatic diols containing 2–8 carbon atoms. Included among the bis-phenols which can be used are bis(p-hydroxy) diphenyl, bis(p-hydroxyphenyl) methane, and bis(p-hydroxyphenyl) propane. Equivalent ester-forming derivatives of diols are also useful (e.g., ethylene oxide or ethylene carbonate can be used in place of ethylene glycol). The term "low molecular weight diols" as used herein should be construed to include such equivalent ester-forming derivatives; provided, however, that the molecular weight requirement pertains to the diol only and not to its derivatives.

Dicarboxylic acids which are reacted with the foregoing long chain glycols and low molecular weight diols to produce the copolyesters of this invention are aliphatic, cycloaliphatic, or aromatic dicarboxylic acids of a low molecular weight, i.e., having a molecular weight of less than about 300. The term "dicarboxylic acids" as used herein, includes equivalents of dicarboxylic acids having two functional carboxyl groups which perform substantially like dicarboxylic acids in reaction with glycols and diols in forming copolyester polymers. These equivalents include esters and ester-forming derivatives, such as acid halides and anhydrides. The molecular weight requirement pertains to the acid and not to its equivalent ester or ester-forming derivative. Thus, an ester of a dicarboxylic acid having a molecular weight greater than 300 or an acid equivalent of a dicarboxylic acid having a molecular weight greater than 300 are included provided the acid has a molecular weight below about 300. The dicarboxylic acids can contain any substituent groups or combinations which do not substantially interfere with the copolyester polymer formation and use of the polymer of this invention.

Aliphatic dicarboxylic acids, as the term is used herein, refers to carboxylic acids having two carboxyl groups each attached to a saturated carbon atom. If the carbon atom to which the carboxyl group is attached is saturated and is in a ring, the acid is cycloaliphatic. Aliphatic or cycloaliphatic acids having conjugated unsaturation often cannot be used because of homopolymerization. However, some unsaturated acids, such as maleic acid, can be used.

Aromatic dicarboxylic acids, as the term is used herein, are dicarboxylic acids having two carboxyl groups attached to a carbon atom in an isolated or fused benzene ring. It is not necessary that both functional carboxyl groups be attached to the same aromatic ring and where more than one ring is present, they can be joined by aliphatic or aromatic divalent radicals or divalent radicals such as —O— or —SO$_2$—.

Representative aliphatic and cycloaliphatic acids which can be used for this invention are sebacic acid, 1,3-cyclohexane dicarboxylic acid, 1,4-cyclohexane dicarboxylic acid, adipic acid, glutaric acid, succinic acid, carbonic acid, oxalic acid, azelaic acid, diethylmalonic acid, allylmalonic acid, 4-cyclohexane-1,2-dicarboxylic acid, 2-ethylsuberic acid, 2,2,3,3-tetramethylsuccinic acid, cyclopentanedicarboxylic acid, decahydro-1,5-naphthalene dicarboxylic acid, 4,4'-bicyclohexyl dicarboxylic acid, decahydro-2,6-naphthalene dicarboxylic acid, 4,4'-methylenebis-(cyclohexane carboxylic acid), 3,4-furan dicarboxylic acid, and 1,1-cyclobutane dicarboxylic acid. Preferred aliphatic acids are cyclohexane-dicarboxylic acids and adipic acid.

Representative aromatic dicarboxylic acids which can be used include terephthalic, phthalic and isophthalic acids, bibenzoic acid, substituted dicarboxy compounds with two benzene nuclei such as bis(p-carboxyphenyl)methane, p-oxy(p-carboxy-phenyl) benzoic acid, ethylene-bis(p-oxybenzoic acid), 1,5-naphthalene dicarboxylic acid, 2,6-naphthalene dicarboxylic acid, 2,7-naphthalene dicarboxylic acid, phenanthrene dicarboxylic acid, anthracene dicarboxylic acid, 4,4'-sulfonyl dibenzoic acid, and C$_1$–C$_{12}$ alkyl and ring substitution derivatives thereof, such as halo, alkoxy, and aryl derivatives. Hydroxyl acids such as p($\beta$-hydroxyethoxy) benzoic acid can also be used providing an aromatic dicarboxylic acid is also present.

Aromatic dicarboxylic acids are an especially preferred class for preparing the copolyester polymers of this invention. Among the aromatic acids, those with 8-16 carbon atoms are especially preferred, particularly the phenylene dicarboxylic acids, e.g., phthalic, terephthalic and isophthalic acids, their dimethyl ester derivatives and mixtures thereof.

It is essential that at least about 50 percent of the short segments are identical and that the identical segments form a homopolymer in the fiber-forming molecular weight range (molecular weight > 5,000) having a melting point of at least about 150°C. and preferably greater than 200°C. Polymers meeting these requirements exhibit a useful level of properties such as tensile strength and tear strength. Polymer melting points are conveniently determined by differential scanning calorimetry.

The short chain ester units will constitute about 15-95 weight percent of the copolyester. The remainder of the copolyester will be the long segments, ergo, the long segment will comprise about 5-85 weight percent of the copolyester.

Most preferred segmented copolyesters for use in this invention are those prepared from dimethyl terephthalate, 1,4-butanediol, and poly(tetramethylene oxide) glycol having a molecular weight of about 600-2,000 or poly(ethylene oxide) glycol having a molecular weight of about 600-1,500. Optionally, up to about 30 mole percent and preferably 5-20 mole percent of the dimethyl terephthalate in these polymers can be replaced by dimethyl phthalate or dimethyl isophthalate. Other preferred copolyesters are those prepared from dimethyl terephthalate, 1,4-butanediol, and poly(propylene oxide) glycol having a molecular weight of about 600-1,600. Up to 30 mole percent and preferably 10-25 mole percent of the dimethyl terephthalate can be replaced with dimethyl isophthalate or butanediol can be replaced with neopentyl glycol until up to about 30 percent and preferably 10-25 percent of the short chain ester units are derived from neopentyl glycol in these poly(propylene oxide) glycol polymers. The polymers based on poly(tetramethylene oxide) glycol are especially preferred because they are easily prepared, have overall superior physical properties, and are especially resistant to water.

The dicarboxylic acids or their derivatives and the polymeric glycol are incorporated into the final product in the same molar proportions as are present in the reaction mixture. The amount of low molecular weight diol actually incorporated corresponds to the difference between the moles of diacid and polymeric glycol present in the reaction mixture. When mixtures of low molecular weight diols are employed, the amounts of each diol incorporated is largely a function of the amounts of the diols present, their boiling points, and relative reactivities. The total amount of glycol incorporated is still the difference between moles of diacid and polymeric glycol.

The polymers described herein can be made conveniently by starting with a conventional ester interchange reaction. A preferred procedure involves heating the dimethyl ester of terephthalic acid with a long chain glycol and a molar excess of 1,4-butane-diol in the presence of a catalyst at 150°-260°C. While distilling off methanol formed by the ester interchange. Depending on temperature, catalyst, glycol excess, and equipment, this reaction can be completed within a few minutes to a few hours. This procedure results in the preparation of a low molecular weight prepolymer which can be carried to a high molecular weight copolyester of this invention by the procedure described below. Such prepolymers can also be prepared by a number of alternate esterification or ester interchange processes; for example, the long chain glycol can be reacted with a high or low molecular weight short chain ester homopolymer of copolymer in the presence of catalyst until randomization occurs. The short chain ester homopolymer or copolymer can be prepared by ester interchange from either the dimethyl esters and low molecular weight diols, as above, or from the free acids with the diol acetates. Alternatively, the short chain ester copolymer can be prepared by direct esterification from appropriate acids, anhydrides, or acid chlorides, for example, with diols or by other processes such as reaction of the acids with cyclic ethers or carbonates. Obviously, the prepolymer might also be prepared by running these processes in the presence of the long chain glycol.

The resulting prepolymer is then carried to high molecular weight by distillation of the excess of short chain diol. This process is known as "polycondensation".

Additional ester interchange occurs during this polycondensation or distillation; the distillation serves to increase the molecular weight and to randomize the arrangement of the copolyester units. Best results are usually obtained if this final distillation or polycondensation is run at less than 1 mm. Hg. pressure and 240°-260°C. for less than 2 hours, e.g., 0.5 to 1.5 hours in the presence of antioxidants such as sym-di-beta-naphthyl-p-phenylenediamine and 1,3,5-trimethyl-2,4,6-tris[3,5-ditertiarybutyl-4-hydroxybenzyl]benzene. Most practical polymerization techniques rely upon ester interchange to complete the polymerization reaction. In order to avoid excessive hold time at high temperatures with possible irreversible thermal degradation, a catalyst for the ester interchange reaction should be employed. While a wide variety of catalysts can be used organic titanates such as tetrabutyl titanate used alone or in combination with magnesium or calcium acetates are preferred. Complex titanates, such as $Mg[HTi(OR)_6]2$, derived from alkali or alkaline earth metal alkoxides and titanate esters are also very effective. Inorganic titanates, such as lanthanum titanate, calcium acetate/antimony trioxide mixtures and lithium and magnesium alkoxides are representative of other catalysts which can be used.

Ester interchange polymerizations are generally run in the melt without added solvent, but inert solvents can be used to facilitate removal of volatile components from the mass at low temperatures. This technique is especially valuable during prepolymer preparation, for example, by direct esterification. However, certain low molecular weight diols, for example, butanediol in terphenyl, are conveniently removed during high polymerization by azeotropic distillation. Other special polymerization techniques, for example, interfacial polymerization of bisphenol with bisacylhalides and bisacylhalide capped linear diols, may prove useful for preparation of specific polymers. Both batch and continuous methods can be used for any stage of copolyester polymer preparation. Polycondensation of prepolymer can also be accomplished in the solid phase by heating divided solid prepolymer in a vacuum or in a stream of inert gas to remove liberated low molecular weight diol. This method has the advantage of reducing degradation because it must be used at temperatures below the softening point of the prepolymer.

The copolyester is modified by the presence of (a) 1.0–50.0 percent by weight, based on said copolyester, of a polyepoxide having at least two functional groups and (b) 0.5–1.1 equivalents per one epoxy equivalent of an epoxy curing agent selected from aromatic and aliphatic polyamines and cyclic anhydrides of polycarboxylic acids. Optionally, from 0.05–0.50 weight percent, based on said copolyester, of an epoxy catalyst may be added to the copolyester.

In more detail, the polyepoxide having a functionality of at least 2 is added to the copolyester in the amount of 1.0 to 50 percent by weight, based on said copolyester, preferably 5 to 40 percent by weight and more preferably 10 to 30 percent by weight.

Any polyepoxide having a functionality of at least two may be utilized for modifying the copolyester of the instant invention. It is much preferred however to use polyepoxides having the following general formula:

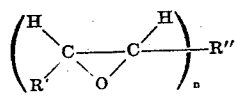

where $n$ = 2–10 and R' and R'' have the meanings given hereinbefore and the polyepoxide has an epoxide equivalent of about 75–1,000. Epoxide compounds obtained by epoxidation of olefins or by reaction of epihalohydrins with active hydrogen compounds are useful in the present compositions.

Representative polyepoxides obtained by epoxidation include vinylcyclohexene dioxide, bis(2,3-epoxycyclopentyl)ether, 3,4-epoxycyclohexylmethyl 3,4-epoxycyclohexane carboxylate, bis(3,4-epoxy-6-methylcyclohexylmethyl)adipate, 3-(3,4-epoxycyclohexane)-8,9-epoxy-dioxaspiro [5.5]-undecane, epoxidized butadiene and epoxidized natural oils.

Epoxides prepared from epihalohydrins and active hydrogen compounds; that is, polyglycidyl compounds, are preferred for use in the present compositions. These polyepoxides may be represented by the general formula:

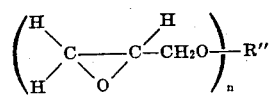

where $n$ is 2–10 and R'' has the meaning given hereinbefore and the polyepoxide has an epoxide equivalent of 75–750. Representative polyepoxides of this type include those prepared by reaction of epichlorohydrin with polyhydric phenols such as 4,4'-isopropylidene diphenol(bisphenol A), tetrabromobisphenol A, resorcinol, hydroquinone, pyrogullol, 4,4'-methylenebis(phenol) and polyphenols derived from phenol or cresol and an aldehyde (novolacs). Other suitable polyepoxides include reaction products of epichlorohydrin and aliphatic compounds containing two to six alcoholic hydroxyl groups such as ethylene glycol, butanediol-1,4, poly(alkylene oxide)glycols and triols, glycerol, 1,2,6-hexanetriol, pentaerythritol and sorbitol. Polyglycidyl esters of polycarboxylic acids such as adipic acid, succinic acid, phthalic acid and mellitic acid are also representative of suitable polyepoxides.

Certain individual polyepoxides having at least two functionalities are particularly preferred in the instant invention. They include diglycidyl ethers of bisphenol A having the following structure:

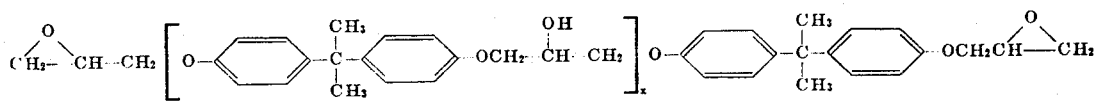

where $x$ is to zero to 5 and the polyglycidyl ethers of phenolformaldehyde novolacs having the following structure:

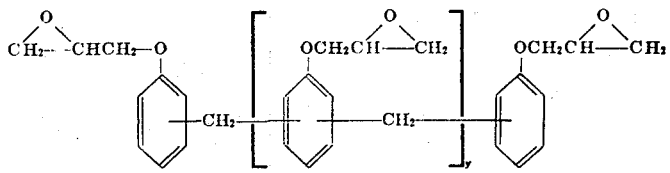

where $y$ is 1 to 6.

The epoxy curing agents which may be utilized are aromatic and aliphatic polyamines and cyclic anhydrides of polycarboxylic acids. The polyamines must contain at least two amine groups which can be primary and/or secondary amine groups.

The primary amine groups may be linked to aliphatic (including cycloaliphatic) or aromatic radicals. The secondary amine groups may be linked to two aliphatic radicals or to one aromatic radical and one aliphatic radical.

The cyclic anhydrides of polycarboxylic acids must contain at least one five or six membered ring including the two anhydride carbons and the anhydride oxygen atom. The two amine groups can be represented by the following formula:

$$\text{X—NH}_2 \text{ and } \text{X—NH} \atop \quad\quad\quad\quad\quad\quad |\ \atop \quad\quad\quad\quad\quad\quad Y$$
(a')   (a'')

where X is an aromatic or aliphatic (including cycloaliphatic) radical and Y is an aliphatic radical and X and Y may be joined to form a five or six membered ring. X and/or Y must contain at least one more amino group which can be represented by formulas (a') and/or (a''). Preferred aromatic radicals are $C_6$–$C_{12}$, preferred aliphatic radicals are $C_1$–$C_{18}$ are preferred cycloaliphatics are $C_5$–$C_{15}$. The aliphatics, aromatics and cycloaliphatic radicals may be substituted with alkoxy, alkyl, halogen or other noninterfering species.

Representative polyamines which may be utilized include ethylene diamine, tetramethylene diamine, bis(hexamethylene)triamine, triethylenetetramine, menthanediamine, β-aminoethylpiperazine, 1,3-diaminocyclohexane, N-methyl-1,3-diaminocyclohexane, 4,4'-methylenebis(cyclohexylamine), m-phenylenediamine, o- and m-toluenediamines, 4,4'-diaminodiphenylmethane, cumene diamine, 4,4',4''-triaminotriphenylmethane, 4,4'-diaminodiphenyl sulfone, 2,4,4'-triaminodiphenyl ether and 2,4-bis(4-aminobenzyl)aniline. Of these polyamines those having two or more aromatic primary amine groups are preferred. Such polyamines contain at least two amine groups which can be represented by the formula $$\text{X-NH}_2 \quad\quad\quad (a')$$

wherein X is an aromatic radical. Particularly preferred aromatic polyamines include m-phenylene diamine, 4,4'-diaminodiphenylmethane and cumene diamine and mixtures thereof.

The cyclic anhydrides of carboxylic acids which can be used to cure the polyepoxide contain at least one structural unit represented by the formula

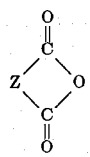

where Z is a bivalent radical which forms a five or six membered ring in combination with the carbonyl two carbon atoms and the oxygen atom of the anhydride. Representative anhydrides include maleic anhydride, succinic anhydride, glutaric anhydride, phthalic anhydride, hexahydrophthalic anhydride, nadic anhydride, nadic methyl anhydride, dodecenyl succinic anhydride, trimellitic anhydride, pyromellitic dianhydride, cyclopentane tetracarboxylic dianhydride, benzophenonetetracarboxylic dianhydride.

The polamine curing agents are preferred over the anhydride curing agents with the primary aromatic polyamines being especially preferred as indicated hereinbefore.

The epoxy curing agents are added in amounts of 0.5 to 1.1 equivalents per one epoxy equivalent and preferably from about 0.85 to 1.0 equivalents per one epoxy equivalent. In the case of the polyamines, one amino hydrogen is equivalent to one epoxy group. In the case of the cyclic anhydrides, one cyclic anhydride group is equivalent to one epoxy group. When the preferred primary aromatic polyamines are used as curing agents, it is most preferred to use about 0.95 equivalents of amine per epoxy equivalent.

The polyepoxide and the curing agent are added to the copolyester by mixing at elevated temperatures near the softening point or melting point of the copolyester in equipment such as rubber mills, extruders and internal mixers (Banbury mixer). In general, the lowest temperature at which effective mixing can be obtained is preferred. Temperatures in the range of about 150°–250°C. are usually required and depend largely on the melting point of the particular polyester being used.

The polyepoxide and curing agent can be added to the finished copolyester immediately after polycondensation and melt blended with a mix screw for instance while it is still in the molten state and prior to cooling or quenching. Alternatively, the polyepoxide and curing agent may be added subsequently by remelting the finished copolyester. A particularly convenient means of adding solid polyepoxides and solid curing agents involves dry blending the polyepoxide and curing agent with copolyester pellets and passing the dry blend through an extruder or injection molding machine. In this manner melt blending can be combined with extrusion or injection molding forming steps. If copolyester blended with polyepoxide and curing agent is cooled promptly after blending, the resulting material can be stored for one to several days before processing as a thermoplastic into finished items.

The polyepoxide and curing agent do not have to be blended with the copolyester simultaneously. In some instances it is convenient to blend the copolyester and polyepoxide well in advance of the addition of curing agent. The epoxide can be added to molten finished copolyester immediately after the polycondensation or the finished copolyester can be remelted. The blend of copolyester and polyepoxide is stable for a prolonged period of time measured in weeks or months. It can be easily dry blended with solid curing agents with mixing occurring as the dry blend is used in an extruder or injection molding machine. When using aliphatic polyamines as curing agents, the curing agent should not be added prior to the polyepoxide as degradation of the copolyester may occur. Aromatic polyamines can be added prior to the polyepoxide, but it is preferred that the polyepoxide be added first or simultaneously. Cyclic anhydrides can be added prior to polyepoxides without any detrimental effect.

After the addition of the polyepoxide and curing agent, the copolyester composition is usually thermosetting, but before curing it can be formed by any means normally used in processing thermoplastics including extrusion and injection and compression molding. The articles produced by such methods must then be cured in order to reach their ultimate properties. Curing can be accomplished at temperatures ranging from about 50° to 140°C. for about 2 hours to 3 days. Curing for about 16 hours at 100°C. is satisfactory in many instances. During curing, the polyepoxide and curing agent react to form a cross-linked resin. It is believed that simultaneously the polyepoxide, particularly if it is in excess, reacts with any carboxyl end groups contained in the copolyester. As a result, the cured product apparently is not merely a blend of copolyester and cured epoxy.

In an embodiment of the instant invention from 0.05–0.5 weight percent of an epoxy catalyst based on the weight of copolyester may also be added. Preferably from 0.1 to 0.3 weight percent of the epoxy catalyst is added to the copolyester.

Suitable epoxy catalysts which may be utilized include secondary aliphatic amines such as dibutylamine, N-methylcyclohexylamine, N-methylpiperazine, piperidine, pyrrolidine and 4,4'-dipiperidine; tertiary aliphatic amines such as N,N-dimethylbenzylamine, N,N-dimethylcyclohexylamine, N,N'-dimethylpiperazine, N-ethylmorpholine, N-methylpiperidine and triethylene diamine; metallic salts of organic acids such as calcium stearate, zinc naphthenate, sodium acetate, stannous octoate and lead naphthenate; and metal halide Lewis acids and their complexes such as boron trifluoride, zinc chloride, stannic chloride, boron trifluoride-piperidine complex and boron trifluoride-monoethanolamine complex.

Of these catalysts, the secondary aliphatic amines are preferred and higher boiling secondary amines having boiling points approaching or exceeding the melting point of the copolyester are especially preferred because they are largely retained during mixing with the copolyetherester. 4,4'-Trimethylene-dipiperidine has been found to be especially effective and convenient to use in the present compositions.

The presence of the epoxy catalyst serves to increase the rate of curing of the epoxy and is believed further to catalyze the reaction of epoxide groups with carboxyl groups present in the copolyester.

If an epoxy catalyst is to be added, it can be added with the polyepoxide and curing agent but is preferably added after the polyepoxide and curing agent have been at least partially melt blended with the copolyester. The catalyst should not be added to the copolyester in the absence of the polyepoxide as this can cause copolyester degradation. In instances where the epoxide or the epoxide and curing agent are added to the molten copolyester emerging from the copolyester process it is usually desirable not to add catalyst at this point. Instead, catalyst can be conveniently mixed with the copolyester as it is being used in operations such as injection molding or extrusion.

As previously indicated, the mixture of copolyester, polyepoxide and curing agent prior to curing can be processed by methods generally useful for thermoplastic materials. After cure has taken place, the polymer compositions are generally no longer thermoplastic and do not melt at temperatures as high as 250°C. The cured polymer exhibits outstanding hydrolytic stability and scuff resistance and improved high temperature properties relative to the starting copolyester. At the same time, the outstanding low temperature properties of the unaltered copolyester are retained in full. The draw-plateau which is characteristic of the stress-strain curve for most copolyesters is reduced or even eliminated in the instant compositions.

The improved properties of the present polymer composition suggest their use in application where hot water and steam are encountered and/or where rough handling is likely to take place. The compositions are useful in applications such as hydraulic hose inner tubes, steam hoses and hose coverings. Because of their scuff resistance and superior low temperature properties, they are also useful in wire coverings, cable jackets, ski boots and molded snowmobile tracks.

The properties of these copolyester compositions can be modified by incorporation of various conventional inorganic fillers such as carbon black, silica gel, alumina, clays, and chopped fiberglass. In general, these additives have the effect of increasing the modulus of the material at various elongations. Compounds having a range of hardness values can be obtained by blending hard and soft polyesters of this invention or by varying the amount and functionality of the added polyepoxide and curing agent.

All parts, proportions and percentages disclosed herein are by weight unless otherwise indicated.

The following examples further illustrate the invention.

TEST PROCEDURES

The following ASTM methods are used in determining the properties of the polymers in the examples:

| | |
|---|---|
| Tensile Strength | D412* |
| Elongation at Break | D412* |
| Permanent Set at Break | D412* |
| 50% MOdulus | D412* |
| 100% Modulus | D412* |
| 300% MOdulus | D412* |
| 500% MOdulus | D412* |
| Shore A Hardness | D676 |
| Shore D Hardness | D1484 |
| Trouser Tear | D470*** |
| Bashore Resilience | D2632 |
| Oven Air Aging | D573 |
| Hydrolytic Stability | D471 |
| Torsional Stiffness (Clash Berg) | D1043 |

\* Cross-head speed 20 inches/minute.
\*\* Modified by use of 1.5 ×3 inch sample with 1.5 inch cut on the long axis of the sample. This configuration avoids "necking down" of the sample at the point of tearing. Cross-head speed 50 inch/minute.

Inherent viscosities of the polymers in the following examples are measured at 30°C. at a concentration of 0.1g./dl. in m-cresol.

The carboxyl group content can be determined by dissolving the copolyester in cresol, adding water and chloroform, and titrating the solution with standardized ethanolic potassium hydroxide. The end point is determined by potentiometry.

EXAMPLES

Copolyester A is prepared by ester interchange of 4,84 moles of dimethyl terephthalate hereinafter (DMT), 1.41 moles of dimethyl isophthalate hereinafter (DMI), 1.0 mole of polytetramethyleneether glycol hereinafter (PTMEG-980) (having a number average molecular weight about 980-butanediol in the presence of a tetrabutyl titanate/magnesium acetate catalyst and a stabilizer [sym-di-beta-naphthyl-phenylene diamine]. Ester interchange is conducted at atmospheric pressure up to a final temperature of 220°C. The ester interchange is followed by polycondensation at 250°C. at less than 1 mm. Hg. for about 90 minutes. The resulting polymer has an inherent viscosity of 1.72 and contains about 27.2 milliequivalents of carboxyl groups per kilogram (kg.) of polymer.

Copolyester B is prepared by ester interchange of 7.85 moles of DMT, 1 mole PTMEG-980 and excess 1,4-butanediol using the ester interchange catalyst and the stabilizer described for the preparation of Copolyester A. The ester interchange and polycondensation reaction is effected under essentially the same conditions as used for the preparation of copolyester A. The resulting polymer has an inherent viscosity of 1.51 and carboxyl content of 27.9 milliequivalents/kg.

| | 1A | 1B | 1C | Control 1D |
|---|---|---|---|---|
| Tensile Strength, psi. | 5050 | 4700 | 4100 | 5700 |
| Elongation at Break, % | 740 | 580 | 400 | 810 |
| 100% Modulus, psi. | 1280 | 1400 | 2100 | 1010 |
| 300% Modulus, psi. | 1740 | 2180 | 3550 | 1270 |
| Trouser Tear, pli. | 270 | 250 | 160 | 315 |
| Shore A Hardness | 92 | 93 | 93 | 92 |
| Torsional Modulus (Clash Berg) at −40°C., psi. | 10285 | -- | -- | 7500 |

| | Equivalent weight* |
|---|---|
| Polyepoxide A | 185-192 |
| Polyepoxide B | 91-102 |
| Polyepoxide C | 190-220 |
| Catalyst A | |

*Range of equivalent weight for commercially available material approximating the indicated structure.

EXAMPLE 1

Copolyester A is mixed with polyepoxide A and 4,4'-methylene dianiline in the amounts tabulated below. The compounding is effected by milling on a steam-heated rubber mill at 165°–170°C. for five minutes. In experiments 1A, B and C the curing agent was added after the polyepoxide was milled into the polymer for a few minutes.

| | 1A | 1B | 1C | 1D |
|---|---|---|---|---|
| Copolyester A (parts) | 100 | 100 | 100 | 100 |
| Polyepoxide A (parts) | 10 | 15 | 30 | - |
| 4,4'-methylene dianiline (parts) | 2.8 | 4.2 | 8.4 | - |

Control polymer 1D represents the unchanged copolyester A.

Properties are measured on slabs of 80 mil thickness which are prepared by compression molding at about 230°C. and then curing at 100°C. for 16 hours. Contrary to control polymer 1D compositions 1A, B and C are no longer soluble in solvents such as m-cresol and do not melt at temperatures above the melting point of copolyester A (e.g., 250°C.).

Properties of the original copolyester and those mixed with the polyepoxide and curing agent are tabulated below:

| | 1A | 1B | 1C | Control 1D |
|---|---|---|---|---|
| Room Temperature Properties | | | | |

| 100°C. Properties | | |
|---|---|---|
| Tensile Strength, psi. | 1550 | >1240 |
| Elongation at Break, % | 510 | >600 |
| 100% Modulus, psi. | 460 | 405 |
| 300% MOdulus, psi. | 950 | 600 |
| 500% MOdulus, psi. | 1440 | 950 |

The copolyester/polyepoxide blends exhibit substantially improved moduli characteristics at room temperature and 100°C. without significant increase in hardness or low temperature stiffness.

EXAMPLE 2

Copolyester A (100 parts) is mixed with polyepoxide A (15 parts) and m-phenylene diamine (1.95 parts) according to the procedure given in Example 1. After shredding of the compounded polymer 80 mil slabs are compression molded at 240°C. and cured for 20 hours at 100°C. The cured polymer is no longer thermoplastic and does not melt at 250°C. Properties of the original copolyester and that modified with polyepoxide and diamine are tabulated below:

| | Original Copolyester | Polyepoxide and Diamine Modified Copolyester |
|---|---|---|
| Original Properties | | |
| Tensile Strength, psi. | 5700 | 6100 |
| Elongation at Break, % | 810 | 780 |
| 100% Modulus, psi. | 1010 | 1190 |
| 300% Modulus, psi. | 1270 | 1600 |
| 500% Modulus, psi. | 1990 | 2330 |
| Trouser Tear, pli. | 315 | 320 |
| Hardness, Shore A | 92 | 92 |

| Physical Properties After Water Immersion at 100°C. for 4 Weeks | | |
|---|---|---|
| Tensile Strength, psi. | 900 | 4250 |
| Elongation at Break, % | 20 | 740 |
| 100% Modulus, psi. | -- | 1400 |
| 300% Modulus, psi. | -- | 1780 |
| 500% Modulus, psi. | -- | 2530 |

| Physical Properties After Heat Aging at 121°C. for 6 Weeks | | |
|---|---|---|
| Tensile Strength, psi. | 2300 | 2950 |
| Elongation at Break, % | 740 | 580 |
| 100% Modulus, psi. | 1030 | 1400 |
| 300% Modulus, psi. | 1350 | 1850 |
| 500% Modulus, psi. | 1550 | 2550 |

The epoxide modification followed by curing resulted in a thermosetting polymer composition with the processing characteristics of a thermoplastic. The cured polymer exhibits more favorable stress strain properties and heat aging characteristics as well as greatly improved hydrolytic stability in comparison to the control polymer.

EXAMPLE 3

Copolyester A (100 parts) is mixed with polyepoxide A (15 parts) and trimellitic anhydride (5 parts) as described in Example 1. After shredding and drying 80 mil slabs were prepared from the compounded polymer by compression molding at 205°C. The cure is carried out by heating for 16 hours at 100°C. followed by 2 hours at 150°C. The resulting polymer has a Shore A hardness of 92 and a 80 percent higher modulus at 300 percent elongation than that observed for copolyester A.

EXAMPLE 4

Five parts of polyepoxide B are mixed with 100 parts of copolyester B and 2.6 parts of 4,4'-methylene dianiline in an agitated flask at 230°C. under a nitrogen atmosphere. The preferred procedure consists of melting first the copolyester followed by the addition of the polyepoxide and finally the amine curing agent and agitating the liquid mixture slowly for a few minutes under these conditions. The resulting polymer blend is then compression molded at 245°C. to 80 mil slabs and cured at 100°C. for 20 hours. The physical properties of the original copolyester and the polyepoxy modified polymer are shown below.

| | Original Copolyester | Copolyester/ Polyepoxy Blend |
|---|---|---|
| Tensile Strength, psi. | 5400 | 4800 |
| Elongation at Break, % | 730 | 690 |
| 100% Modulus, psi. | 2200 | 2150 |
| 300% Modulus, psi. | 2460 | 2250 |
| 500% Modulus, psi. | 3330 | 3950 |
| Shore D Hardness | 56 | 56 |
| Trouser Tear, pli. | 410 | 425 |

The polyepoxy modified copolyester exhibits the same excellent properties of the unmodified polymer, but shows a similar improvement in hydrolytic stability as illustrated in Example 2.

EXAMPLE 5

Copolyester A is compounded with polyepoxide C and 4,4'-methylene dianiline in the amounts tabulated below in the presence of catalyst A according to the procedure of Example 1:

| | 5A | 5B | 5C |
|---|---|---|---|
| Copolyester A (parts) | 100 | 100 | 100 |
| Polyepoxide C (parts) | 10 | 15 | 20 |
| 4,4'-methylene dianiline parts | 2.5 | 3.75 | 5.0 |
| Catalyst A (parts) | 0.2 | 0.2 | 0.2 |

Eighty mil slabs are prepared from the compounded polymers by compression molding at 240°C. and curing at 100°C. for 16 hours. The cured polymers are no longer soluble in m-cresol and do not melt at 250°C.

Properties of the original copolyester and those modified with polyepoxide are shown below:

| Room Temperature Properties | 5A | 5B | 5C | Copolyester A |
|---|---|---|---|---|
| Tensile Strength, psi. | 5300 | 4300 | 3750 | 5700 |
| Elongation at Break, % | 600 | 530 | 460 | 810 |
| 50% Modulus, psi. | 1150 | 1140 | 1310 | 720 |
| 100% Modulus, psi. | 1410 | 1410 | 1675 | 1010 |
| 300% Modulus, psi. | 2450 | 2775 | 3080 | 1270 |
| Hardness, Shore A | 93 | 95 | -- | 92 |
| Hardness, Shore D | -- | 48 | 50 | -- |
| Resilience (Bashore), % | 54 | 54 | 52 | 53 |
| Torsional Modulus (Clash Berg) at −40°C., psi. | 6450 | 7650 | 9650 | 7500 |

Polymer compositions 5A, B and C exhibit significantly higher moduli than the control polymer, while maintaining the excellent low temperature properties and high resilience of the copolyester A. Furthermore, the cured epoxy modification results in greatly improved scuff resistance.

What is claimed is:

1. A segmented copolyester composition consisting essentially of (a) a multiplicity of recurring long chain ester units and short chain ester units joined head-to-tail through ester linkages, said long chain ester units being represented by the formula I 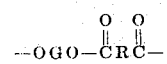

and said short chain units being represented by the formula

II 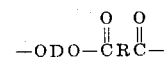

where G is a divalent radical remaining after the removal of terminal hydroxyl groups from a poly(alkylene oxide) glycol having a molecular weight of about 400–6,000 and a carbon-to-oxygen ratio of about 2.0–4.3; R is a divalent radical remaining after removal of carboxyl groups from a dicarboxylic acid having a molecular weight less than about 300 and D is a divalent radical remaining after removal of hydroxyl groups from a diol having a molecular weight less than about 250; provided said short chain ester units amount to about 15–95 percent by weight of said copolyester, and at least about 50 percent of said short chain ester units are identical and (b) from about 1.0 to 50 percent by weight, based on said copolyester of a polyepoxide having a functionality of not less than about 2, and (c) from about 0.5 to 1.1 equivalents per epoxy equivalent of an epoxy curing agent selected from aromatic and aliphatic polyamines and cyclic anhydrides of polycarboxylic acids.

2. The composition of claim 1 wherein the curing agent is a polyamine having at least two aromatic primary amine groups.

3. The composition of claim 2 wherein said curing agent is selected from the group consisting of m-phenylene diamine, 4,4'-diamino diphenylmethane, cumene diamine and mixtures thereof.

4. The composition of claim 1 wherein said curing agent is a cyclic anhydride of a carboxylic acid which has at least one structural unit represented by the formula:

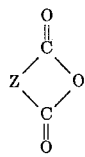

wherein Z is a bivalent radical which forms a five or six membered ring in combination with the two carbonyl carbon atoms and the oxygen atom of the anhydride.

5. The composition of claim 1 wherein the polyepoxide has an epoxide equivalent of about 50–2,000 and is represented by the general formula:

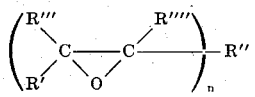

wherein $n$ has a value of about 2 to 15, R', R''' and R'''' are independently selected from the group consisting of hydrogen and lower alkyl, R'' is a polyvalent radical consisting essentially of C, H and O, and R' and R'' may be joined to form a carbocyclic ring.

6. The composition of claim 5 wherein R'' contains carbocyclic aromatic nuclei substituted with Cl or Br.

7. The composition of claim 5 wherein R''' and R'''' are hydrogen, $n$ is 2 to 10 and the polyepoxide has an epoxide equivalent of about 75–1,000.

8. The composition of claim 5 wherein said polyepoxide is a polyglycidyl compound.

9. The composition of claim 1 wherein said copolyester also contains 0.05–0.5 weight percent, based on the weight of copolyester, of an epoxy catalyst.

10. The composition of claim 9 wherein said epoxy catalyst is a secondary aliphatic amine.

11. The composition of claim 1 wherein said dicarboxylic acid is selected from the group consisting of phthalic acid, terephahalic acid, isophthalic acid, their esters and mixtures thereof.

12. The composition of claim 2 wherein the poly(alkylene oxide) glycol is poly(tetramethylene oxide) glycol having a molecular weight of about 600–2,000.

13. The composition of claim 2 wherein said glycol is poly(tetramethylene oxide) glycol having a molecular weight of about 600–2,000, said dicarboxylic acid is dimethyl terephthalate and said diol is 1,4-butanediol.

14. The composition of claim 2 wherein said dicarboxylic acid is a mixture of dimethyl terephthalate and a maximum of 30 mole percent of dimethyl isophthalate, dimethyl phthalate or mixtures thereof.

15. The composition of claim 1 wherein said polyepoxide is a diglycidyl ether of bisphenol A.

16. The composition of claim 1 wherein said polyepoxide is a polyglycidyl ether of a phenol-formaldehyde novolac.

* * * * *